US006973775B2

United States Patent
Hoffmann et al.

(10) Patent No.: US 6,973,775 B2
(45) Date of Patent: Dec. 13, 2005

(54) METHOD FOR DESULFATING A NITROGEN OXIDE STORAGE CATALYST

(75) Inventors: Michael Hoffmann, Aschaffenburg (DE); Harald Klein, Glattbach (DE); Klaus-Ingo Prieger, Nürnberg (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 18 days.

(21) Appl. No.: 10/637,884

(22) Filed: Aug. 8, 2003

(65) Prior Publication Data

US 2004/0112042 A1 Jun. 17, 2004

(30) Foreign Application Priority Data

Aug. 23, 2002 (DE) ............................... 102 38 771

(51) Int. Cl.[7] .............................................. F01N 3/00
(52) U.S. Cl. ............................ 60/286; 60/274; 60/295; 60/297
(58) Field of Search .................... 60/274, 276, 285, 60/286, 295, 297

(56) References Cited

U.S. PATENT DOCUMENTS

| 5,832,722 | A | * | 11/1998 | Cullen et al. ................. 60/274 |
| 5,974,788 | A | * | 11/1999 | Hepburn et al. .............. 60/274 |
| 6,082,325 | A |   | 7/2000  | Digeser et al. |
| 6,161,377 | A | * | 12/2000 | Boegner et al. .............. 60/274 |
| 6,199,373 | B1 | * | 3/2001  | Hepburn et al. .............. 60/274 |
| 6,530,216 | B2 |   | 3/2003  | Pott |
| 6,637,189 | B1 | * | 10/2003 | Boegner et al. .............. 60/274 |
| 6,823,657 | B1 | * | 11/2004 | Waschatz et al. ............. 60/274 |

FOREIGN PATENT DOCUMENTS

| DE | 197 50 226 C1 | 11/1997 |
| DE | 196 36 790 A1 | 3/1998 |
| DE | 198 27 195 A1 | 12/1999 |
| DE | 198 51 843 A1 | 5/2000 |
| DE | 198 51 843 B4 | 5/2000 |
| DE | 198 49 082 A1 | 10/2000 |
| DE | 100 26 762 A1 | 6/2001 |
| DE | 100 26 762 A1 | 12/2001 |
| EP | 0 560 991 B1 | 7/1997 |
| EP | 0 829 623 B1 | 4/2003 |
| GB | 2 344 772 B | 7/2002 |
| WO | WO 00/08312 | 2/2000 |
| WO | WO 02/02921 A1 | 1/2002 |

OTHER PUBLICATIONS

European Patent Office Search Report for EP 03 01 8624, dated Nov. 11, 2003.

* cited by examiner

*Primary Examiner*—Binh Q. Tran
(74) *Attorney, Agent, or Firm*—Kalow & Springut LLP

(57) ABSTRACT

The invention relates to a method for desulfating a nitrogen oxide storage catalyst that contains stored nitrogen oxides and sulfur oxides and that forms part of an exhaust gas purification system of a lean-burn engine. The method provides that, to initiate desulfation, the temperature of the catalyst is increased to the point where thermal desorption of the nitrogen oxides stored in the catalyst sets in, and the onset of thermal desorption of the nitrogen oxides is used as the signal to enrich the air/fuel mixture to perform the desulfation.

6 Claims, No Drawings

METHOD FOR DESULFATING A NITROGEN OXIDE STORAGE CATALYST

FIELD OF INVENTION

The present invention relates to the exhaust gas purification of lean-burn engines. In particular, the invention relates to a method for desulfating a nitrogen oxide storage catalyst that is a component of an exhaust gas purification system of a lean-burn engine.

BACKGROUND OF INVENTION

Lean-burn engines are operated primarily with a lean air/fuel mixture, i.e., the air/fuel mixture contains more oxygen than is necessary for complete combustion of the fuel. The composition of the air/fuel mixture is frequently described by the air/fuel ratio $\lambda$ normalized to stoichiometric conditions, hereinafter also referred to as the excess air coefficient. The air/fuel ratio for stoichiometric conditions has a value of 14.7 for conventional engine fuels. The excess air coefficient in this case is 1.0. In the case of air deficiency, i.e., in a rich air/fuel mixture, $\lambda$ is less than 1.0; in the case of air excess, i.e., in a lean air/fuel mixture, $\lambda$ is greater than 1.0. In the absence of selective absorption in the engine of specific components of the combustion gases, the exhaust gas leaving the engine has the same excess air coefficient as the air/fuel mixture supplied to the engine.

Lean-burn engines are distinguished by lower fuel consumption as compared to conventional engines, which are operated primarily with a stoichiometric air/fuel mixture. Lean-burn engines include gasoline engines developed for lean-burn operation and diesel engines.

Because of the high oxygen content of the exhaust of the lean-burn engine, it is difficult to reduce the nitrogen oxides (NOx) emitted by the lean-burn engine to nitrogen to make them harmless. To remove nitrogen oxides from the lean exhaust gas of internal combustion engines, so-called nitrogen oxides storage catalysts—hereinafter referred to as storage catalysts for short—were developed. Storage catalysts adsorb the nitrogen oxides in the lean exhaust gas in the form of nitrates and release them again in rich exhaust gas.

The mode of operation and composition of nitrogen oxides storage catalysts is described, for example, in European Patent EP 0 560 991 B1. The storage material used in these catalysts contains at least one component selected from the group consisting of the alkali metals (potassium, sodium, lithium, cesium), the alkaline-earth metals (barium, calcium) or the rare-earth metals (lanthanum, yttrium). The storage catalyst contains platinum as the catalytically active element. Under oxidizing exhaust gas conditions, i.e., in lean-burn operation, the storage materials can store the nitrogen oxides contained in the exhaust gas in the form of nitrates. This requires, however, that the nitrogen oxides, which depending on the engine type and its mode of operation consist of approximately 60 to 95% nitrogen monoxide, are first oxidized to nitrogen dioxide. This occurs on the platinum component of the storage catalyst.

Since the capacity of the storage catalyst is limited, the catalyst must be regenerated from time to time. For this purpose, the excess air coefficient of the air/fuel mixture supplied to the engine, and thus also the excess air coefficient of the exhaust gas leaving the engine, must be lowered briefly to values of less than 1. This is referred to as enriching the air/fuel mixture of the exhaust gas. Thus, during this brief operating phase, reducing conditions are present in the exhaust gas before the exhaust gas enters the storage catalyst.

Under the reducing conditions present during the enrichment phase, the nitrogen oxides stored in the form of nitrates are released again (desorbed) and are reduced to nitrogen on the storage catalyst with simultaneous oxidation of carbon monoxide, hydrocarbons and hydrogen, as in conventional three-way catalysts. This process is hereinafter referred to as NOx regeneration.

The storage phase typically lasts 60 seconds, while NOx regeneration requires about 5 to 20 seconds.

The described process was developed for gasoline engines operated under lean-burn conditions, so-called lean-burn engines. Until a few years ago, this process could be used only to a limited extent in diesel engines because it involved a loss of comfort in the running properties of the diesel engine during the rich phase (German Laid Open Publication DE 196 36 790 A1). Meanwhile, however, engine control systems (e.g., German Patent Specification DE 197 50 226 C1 corresponding to U.S. Pat. No. 6,082,325) that allow brief rich-burn operation of a diesel engine without any noticeable loss of comfort have been developed. As a result, this process can now also be used in diesel engines.

Despite their great potential for removing nitrogen oxides from the exhaust gas of diesel engines, nitrogen oxide storage catalysts are not widely used today. A significant problem encountered in the use of nitrogen oxide storage catalysts is the sulfur content of the fuels, particularly of diesel fuels. Various sulfur compounds are created during combustion—sulfur oxides (SOx) in lean-burn operation. The sulfur oxides poison the storage components of the storage catalyst. This poisoning essentially occurs in the same manner as the storage of the nitrogen oxides. Sulfur dioxide emitted by the diesel engine is oxidized to sulfur trioxide on the catalytically active noble metal component of the storage catalyst. Sulfur trioxide reacts with the storage materials of the storage catalyst in the presence of the water vapor contained in the exhaust gas to form the corresponding sulfates. A particular drawback is that the absorption of sulfur trioxide is preferred compared to the absorption of nitrogen oxides, and the sulfates formed are thermally very stable. Thus, the formation of the sulfates competes with the storage of the nitrogen oxides (NOx), and the nitrogen oxide storage capacity of the catalyst is clearly reduced because of the poisoning with sulfur oxides. Consequently, the stored sulfur oxides must therefore be removed from the storage catalyst from time to time to restore the full nitrogen oxide storage capacity.

Removal of sulfur oxides requires special conditions that are distinct from the conditions for NOx regeneration; in other words, during NOx regeneration there is no removal of sulfur components from the storage catalyst, a process hereinafter referred to as desulfation. For desulfation, the storage catalyst must be operated under reducing conditions, i.e., with rich exhaust. In addition, high exhaust gas temperatures are required to heat the catalyst. The catalyst temperature required for desulfation depends on the type of storage material used. Typically, the temperatures required for desulfation are above 650° C. This is a critical parameter, since at low temperatures desulfation proceeds too slowly, and at excessively high temperatures the storage catalyst may be permanently damaged by heat.

German Laid Open Publication DE 198 27 195 A1 describes a method for desulfating a NOx storage catalyst arranged in the exhaust tract of a lean-burn internal combustion engine. To desulfate this NOx storage catalyst, the internal combustion engine is operated in several rich/lean cycles after a predefined desulfation temperature has been reached. In the rich phase of these cycles, the lambda value is reduced to preferably 0.95. This significantly accelerates the emission of the deposited sulfur as sulfur dioxide, while an undesirable hydrogen sulfide formation occurs only with a time delay. The duration of the rich phase is selected in such a way that no noticeable emission of hydrogen sulfide is ascertainable. The rich and lean periods of the cycles are preferably 2 to 10 seconds and 2 to 6 seconds, respectively.

German Laid Open Application DE 198 49 082 A1 describes a further method for desulfating a NOx storage catalyst arranged in the exhaust tract of a lean-burn internal combustion engine. After a predefined relatively low desulfation temperature of about 600° C. has been reached, the lambda value of the exhaust gas is initially reduced to a constant value of about 0.98 for a specific period of time. Subsequently, the internal combustion engine is operated with an oscillating lambda value, where the mean value is reduced from 0.98 to a value of 0.93 to 0.95 as a function of time. The oscillation frequency is between 0.1 and 0.2 Hz. To increase the desulfation rate, the mean catalyst temperature is increased to approximately 700 to 720° C.

Neither DE 198 27 195 A1 nor DE 198 49 082 A1 give any indication as to the means used to increase the temperature of the NOx storage catalyst to the desulfation temperature or as to how the temperature is measured. It is feasible, for example, to install a temperature sensor in the body of the NOx storage catalyst. Technically, however, this makes little sense because cracks starting from this installation site and propagating within the body of the NOx storage catalyst because of alternating thermal stresses during operation may eventually destroy the NOx storage catalyst.

German Laid Open Publication DE 100 26 762 A1 describes a further method for desulfating a NOx storage catalyst. Upstream and downstream of the NOx storage catalyst a thermocouple for measuring the temperature and a λ/NOx sensor are respectively disposed in the exhaust track. The system checks whether SOx regeneration is required by using a suitable mathematical model, a comparison of the lambda signals of a broadband sensor after the NOx storage catalyst during performance, a comparison of the lambda signal before and after the catalyst during NOx regeneration, or the signal of a NOx sensor during the lean phase. If it is determined that SOx regeneration is required, the exhaust temperature is first increased to the desulfation temperature of between 500 and 800° C. SOx regeneration is effected by alternating lean/rich operation. The intervals of the alternating lean/rich operation are optionally regulated by constant time periods or by temperature sensors in such a way that the exhaust temperature is maintained within a temperature range optimal for the desulfation process, i.e., between 500 and 800° C.

For the temperature increase during SOx regeneration, i.e., desulfation, DE 100 26 762 A1 proposes additional fuel injection (with and without torque component), late combustion, multistage combustion or external heating means. According to DE 100 26 762 A1, the temperature during desulfation is monitored either by a suitable mathematical model or by temperature sensors disposed upstream and downstream of the storage catalyst. Using a mathematical model to regulate the exhaust temperature appears too risky because this does not actually monitor the exhaust temperature so that damage to the catalyst as a result of excessively high exhaust gas temperatures cannot be excluded. Nor does measuring the temperature upstream of the catalyst provide any information on the actual temperature within the catalyst. Measuring the exhaust temperature downstream of the catalyst is also risky because an excessively high exhaust temperature is detected only after the catalyst has already been damaged.

The present invention addresses a short-coming of the prior art by providing a method for desulfating a storage catalyst that can be performed with little control complexity and that largely prevents damage to the storage catalyst due to excessively high temperatures during desulfation.

SUMMARY OF INVENTION

The present invention provides a method for desulfating a nitrogen oxide storage catalyst that contains stored nitrogen oxides and sulfur oxides and that is a component of an exhaust gas purification system of a lean-burn engine. In order to initiate desulfation, the temperature of the catalyst is increased under lean exhaust conditions to the point at which thermal desorption of the nitrogen oxides stored in the catalyst sets in. The onset of thermal desorption of the nitrogen oxides is used as the signal to enrich the air/fuel mixture to perform the desulfation.

The method can be used for all conventional storage catalysts. Suitable storage components are oxidic compounds of at least one component of the group consisting of the alkali metals (potassium, sodium, lithium, cesium), the alkaline earth metals (magnesium, barium, calcium, strontium) and the rare earth metals (cerium, lanthanum, yttrium). The catalytically active element contained in the storage catalyst is preferably platinum. These materials are capable of adsorbing the nitrogen oxides in the exhaust gas of the lean-burn engine. Depending on the material selected, this adsorption occurs in a temperature range of between 300 and 500° C.

According to one embodiment, the present invention provides a method for desulfating a nitrogen oxide storage catalyst, wherein said nitrogen oxide storage catalyst contains stored nitrogen oxides and sulfur oxides and is a component of an exhaust gas purification system of a lean-burn engine, said method comprising: increasing the temperature of a catalyst under lean exhaust conditions to a temperature at which thermal desorption of the nitrogen oxides sets in; and enriching the air/fuel mixture, wherein said enriching is commenced at the onset of said thermal desorption, and said thermal desorption serves as a signal to commence said enriching thereby desulfating of the nitrogen oxide storage catalyst.

DETAILED DESCRIPTION OF THE INVENTION

The present invention will now be described in connection with preferred embodiments. These embodiments are presented to aid in an understanding of the present invention and are not intended, and should not be construed, to limit the invention in any way. All alternatives, modifications and equivalents that may become apparent to those of ordinary skill in the art upon reading this disclosure are included within the spirit and scope of the present invention.

This disclosure is not a primer on catalysts. Basic concepts known to persons skilled in the art have not been set forth in detail.

The present invention is directed to a method for desulfating a nitrogen oxides storage catalyst. The method commences with $NO_x$ regeneration. $NO_x$ regeneration within the scope of this invention is defined as the release of the adsorbed nitrogen oxides under reducing conditions. The reducing conditions are adjusted by enriching the air/fuel mixture to excess air coefficients of between 0.9 and 0.99. The nitrogen oxides are then desorbed without requiring any significant temperature increase in the storage catalyst. Thus, NOx regeneration essentially occurs in the same temperature interval in which adsorption takes place under lean exhaust conditions. Experience has shown that NOx regeneration of the storage catalyst is necessary approximately every 1 to 2 minutes.

However, the nitrogen oxides can also be released under lean exhaust conditions by a corresponding increase in the temperature. Within the scope of the invention this is referred to as thermal desorption of the nitrogen oxides. The temperatures required for thermal desorption are typically about 50 to 300° C. above the temperature range where adsorption takes place.

Following $NO_x$ regeneration, there is desulfation. The bond of the sulfur oxides to the storage components is stronger than the bond of the nitrogen oxides to the storage components. As a result, desulfation, i.e., desorption of the sulfur oxides under reducing exhaust gas conditions, requires higher temperatures of the storage catalyst than NOx regeneration, which is induced by a rich exhaust. Normally, the temperature range for desulfation overlaps with the temperature range for the thermal desorption of the nitrogen oxides. According to the invention, the onset of the thermal desorption of the nitrogen oxides is therefore used as the indicator that the temperature of the storage catalyst is sufficient for subsequent desulfation. After thermal desorption of the nitrogen oxides has been detected, the engine control system is therefore instructed to switch the operation of the lean-burn engine to a rich air/fuel mixture.

Specifically, the method involves the following steps. A decision process, which does not form part of the scope of the invention, is used to determine whether desulfation is necessary to restore the nitrogen oxide storage capacity of the storage catalyst. This decision can be made in different ways as described, for example, in DE 100 26 762 A1. The concentration of sulfur oxides in the exhaust of a diesel engine is substantially lower than the concentration of nitrogen oxides. Desulfation of the storage catalyst is thus required less often than NOx regeneration of the catalyst. In the simplest case, desulfation may be carried out, for example, at fixed distance intervals, after a predefined number of NOx regenerations or after consumption of a predefined amount of fuel.

After the decision to perform desulfation has been made, the temperature of the catalyst is increased during a phase when the lean-burn engine is operated with a lean air/fuel mixture, i.e., during a phase when nitrogen oxides are stored on the storage catalyst, until thermal desorption of the nitrogen oxides sets in. Since the exhaust at that moment is lean—unlike in normal NOx regeneration—the desorbed nitrogen oxides leave the storage catalyst without reduction and can be detected using, for example, a nitrogen oxide sensor, which is disposed downstream of the catalyst in the exhaust gas purification system. The onset of the thermal desorption of the nitrogen oxides is used as the signal that the temperature of the storage catalyst has reached a level sufficient for desulfation and that desulfation can be initiated by enriching the exhaust gas.

Desulfation itself can then be carried out using a conventional method known in the art, preferably using alternating lean/rich operation with suitable amplitudes and frequencies.

To ensure reliable and reproducible detection of the released nitrogen oxides during the temperature increase of the storage catalyst under lean exhaust conditions, the measures required to increase the temperature are preferably introduced only toward the end of a storage phase for the nitrogen oxides, so as to ensure a defined state of loading with nitrogen oxides of the storage catalyst.

The temperature increase of the storage catalyst required for desulfation can be achieved by external heating means or by heating the exhaust gas using engine-related measures. For external heating of the catalyst, electrical heating of the storage catalyst may be used. Suitable engine-related measures to heat the exhaust gas in modern diesel engines include additional fuel injection, late combustion or multi-stage combustion.

The duration of desulfation is limited to 1 to 20 seconds, preferably 1 to 15 seconds, particularly preferably 2 to 10 seconds. Desulfation is therefore pulsed. The optimum duration of the desulfation pulse depends on the following considerations. Unlike in NOx regeneration, it is not desirable in desulfation to reduce the desorbed sulfur oxides. Rather, the sulfur stored on the catalyst should be released into the environment as fully as possible in the form of sulfur dioxide. The reduction of the sulfur oxides causes hydrogen sulfide to form, which is significantly more toxic than sulfur dioxide. The formation of hydrogen sulfide is largely suppressed by the oxygen stored in the exhaust gas purification system during lean-burn operation of the diesel engine. Once the stored oxygen has been consumed, the desorbed sulfur oxides are reduced down to hydrogen sulfide on the storage catalyst. Desulfation must therefore be stopped in time to prevent excessive emission of hydrogen sulfide. This approach requires relatively frequent desulfation to minimize the average sulfate concentration on the storage catalyst. Desulfation cycles after approximately 1000 to 10000 NOx regeneration cycles have proven to be suitable. The optimum number of NOx regeneration cycles between two desulfation cycles depends on the composition of the storage catalyst and the sulfur content of the fuel.

To obtain a stronger desulfation than is possible in the above-described pulsed desulfation, the excess air coefficient of the air/fuel mixture supplied to the diesel engine can be modulated during desulfation between a value of less than 1 and a value of more than 1, preferably at a frequency between 1 and 5 Hz. The modulation frequency of this oscillating desulfation is selected in such a way that the oxygen stored in the exhaust gas purification system during the rich phases is used up. During the lean phases, oxygen is again stored in the exhaust gas purification system. This requires a duration of the lean phases between the rich phases of 2 to 15 seconds maximum. In the oscillating rich-lean-rich operation, the lean phases may not be too short because the oxygen storage capacities in the exhaust gas purification system will otherwise not be sufficiently filled. This increases the risk of sulfur emission in the form of hydrogen sulfide and carbonyl sulfide (COS). The optimum duration of the lean phases depends on the amount of the oxygen storing components contained in the exhaust gas purification system, on the type of the material, the temperature of the storage catalyst, and the length of the subsequent rich phases. Experience has shown that lean phases in excess of 15 seconds cause the catalyst temperature to drop so that the catalyst needs to be reheated.

As may be seen from the above explanations, the optimum parameters for the two described desulfation strategies depend on the oxygen storage capacity in the exhaust gas purification system. As a result, they can be influenced through the oxygen storing components with which the storage catalyst is equipped. Preferably, cerium-oxide based oxygen storing components are added to the storage catalyst.

Desulfation increases fuel consumption because of the required high catalyst temperatures and the necessary enrichment of the air/fuel mixture. This additional fuel consumption can be kept low if desulfation is carried out only during the phases when the diesel engine operates at high load and at correspondingly high exhaust temperatures. In this case, only a slight temperature increase, or even no further temperature increase at all, is required for desulfation.

The onset of thermal desorption of the nitrogen oxides during heating of the storage catalyst—which is important for the method—is preferably determined with the aid of a nitrogen oxide sensor inserted in the exhaust gas purification system downstream of the storage catalyst. A nitrogen oxide sensor also senses sudden oxygen variations and can therefore be used to regulate the air/fuel mixture. Optionally, an oxygen sensor can also be arranged in the exhaust gas purification system upstream of the storage catalyst.

What is claimed is:

1. A method for desulfating a nitrogen oxide storage catalyst, wherein said nitrogen oxide storage catalyst contains stored nitrogen oxides and sulfur oxides and is a component of an exhaust gas purification system of a lean-burn engine, said method comprising:
   (i) increasing the temperature of the catalyst under lean exhaust conditions to a temperature at which thermal desorption of the nitrogen oxides sets in; and
   (ii) enriching the air/fuel mixture, wherein said enriching is commenced at the onset of said thermal desorption, thereby causing desulfating of the nitrogen oxide storage catalyst;
   wherein the onset of thermal desorption of the nitrogen oxides during heating of the storage catalyst is determined with the aid of a nitrogen oxide sensor that is inserted into the exhaust gas purification system downstream of the nitrogen oxide storage catalyst.

2. The method according to claim 1, wherein said increasing the temperature occurs by external heating means or by using engine-related measures to heat the exhaust gas.

3. The method according to claim 2, wherein the engine-related measures to heat the exhaust gas are selected from the group consisting of additional fuel injection, late combustion and multistage combustion.

4. The method according to claim 3, wherein the air/fuel ratio normalized to stoichiometric conditions is lowered to a value of between 0.8 and 0.99 during desulfation.

5. The method according to claim 4, wherein the duration of desulfation is limited to 2 to 10 seconds.

6. The method of claim 3, wherein during desulfation, the air/fuel ratio normalized to stoichiometric conditions is modulated between a value of less than 1 and a value of more than 1 at a frequency of between 1 and 5 Hz.

* * * * *